Dec. 20, 1960   R. W. SONNENFELDT   2,965,845
MARKER PULSE CIRCUIT
Original Filed Feb. 28, 1955   4 Sheets-Sheet 1

INVENTOR.
RICHARD W. SONNENFELDT
BY
ATTORNEY

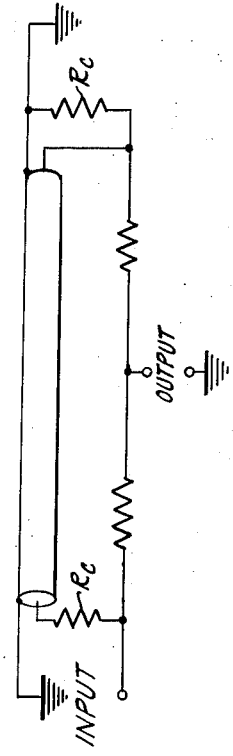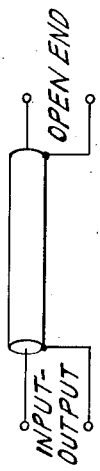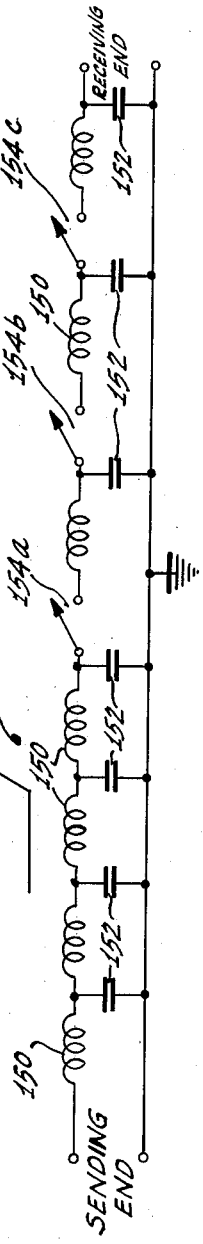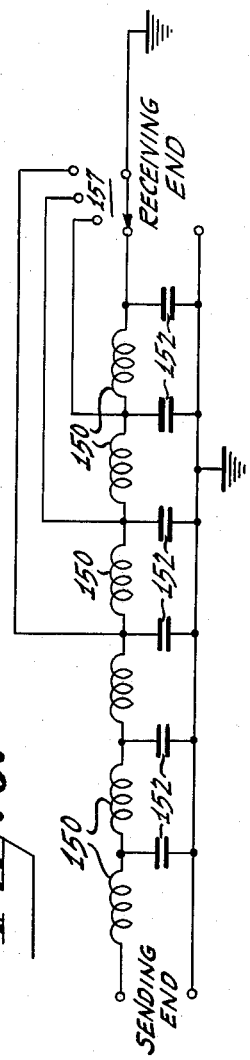

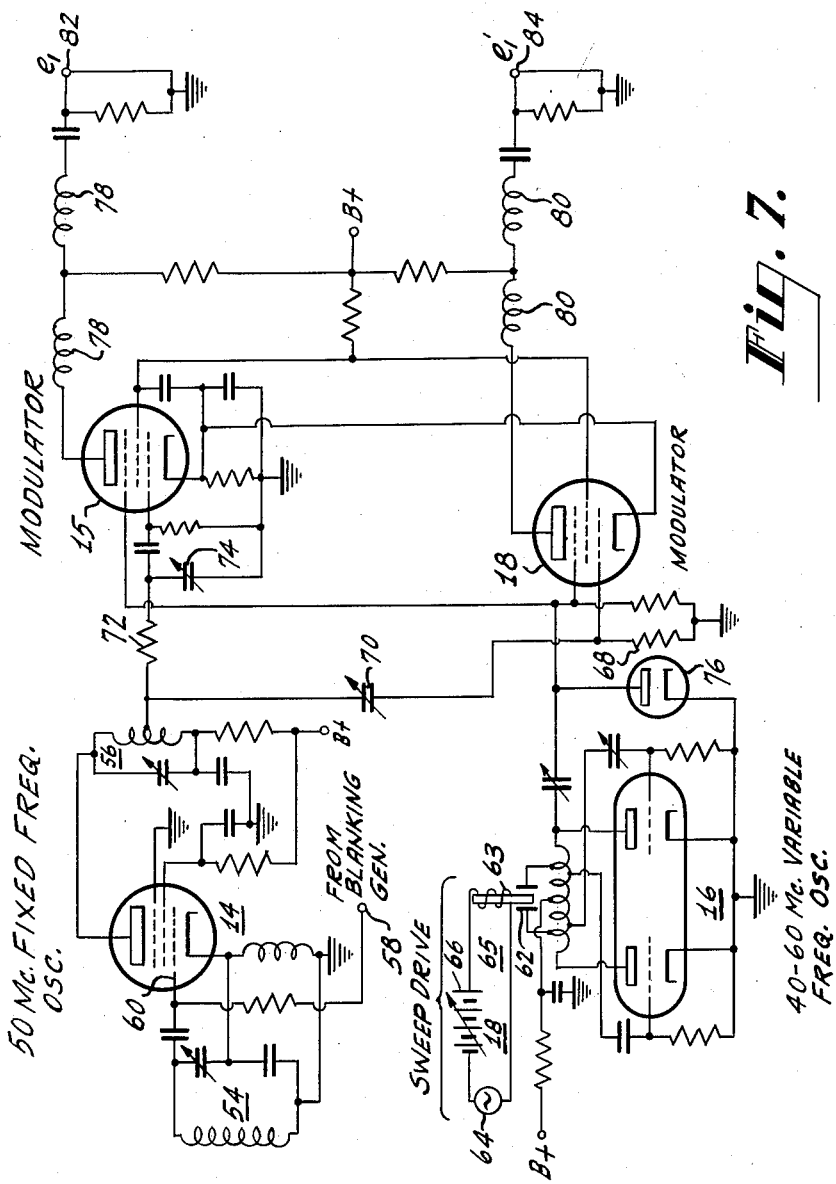

United States Patent Office 2,965,845
Patented Dec. 20, 1960

2,965,845

MARKER PULSE CIRCUIT

Richard W. Sonnenfeldt, Delaware Township, Camden County, N.J., assignor to Radio Corporation of America, a corporation of Delaware Original application Feb. 28, 1955, Ser. No. 490,825, now Patent No. 2,906,946, dated Sept. 29, 1959. Divided and this application Apr. 11, 1956, Ser. No. 577,581

14 Claims. (Cl. 328—28)

This application is a division of application Serial No. 490,825, filed February 28, 1955, now Patent No. 2,906,946 issued September 29, 1959, and it relates to new and useful pulse generating circuits.

A general object of this invention is to provide a relatively simple, and yet highly efficient circuit for producing accurately spaced pulses.

Another object is to provide an improved system for generating frequency markers at accurately spaced frequency intervals.

Another object of the invention is to provide an improved system for generating markers of the above type, which are especially suitable for display on a visual display device such as a cathode ray tube indicator.

A further object of the present invention is to provide a highly accurate marker signal generator for use with a swept frequency oscillator.

The circuit of the invention includes a delay line which may be short-circuited, open-circuited or terminated at both ends in its characteristic impedance. An input wave, which is swept in frequency, is applied to the sending end of the delay line. If the delay line is short- or open-circuited, an output wave is taken from the sending end of the delay line. If the delay line is terminated at both ends in its characteristic impedance, an output wave is taken from a high impedance network, such as a voltage divider, which extends from the sending to the receiving end of the network. The output wave, in either case, includes voltage nodes spaced in frequency from one another and may be differentiated to produce pulses.

The invention will be described in greater detail by reference to the following description taken in connection with the accompanying drawing in which:

Figures 3–6 are illustrations of different types of delay lines which may be employed in the marker generator of Figure 1; and Figure 7 is a schematic circuit diagram of a variable sweep generator.

In the figures similar reference numerals refer to similar elements.

Figure 1:
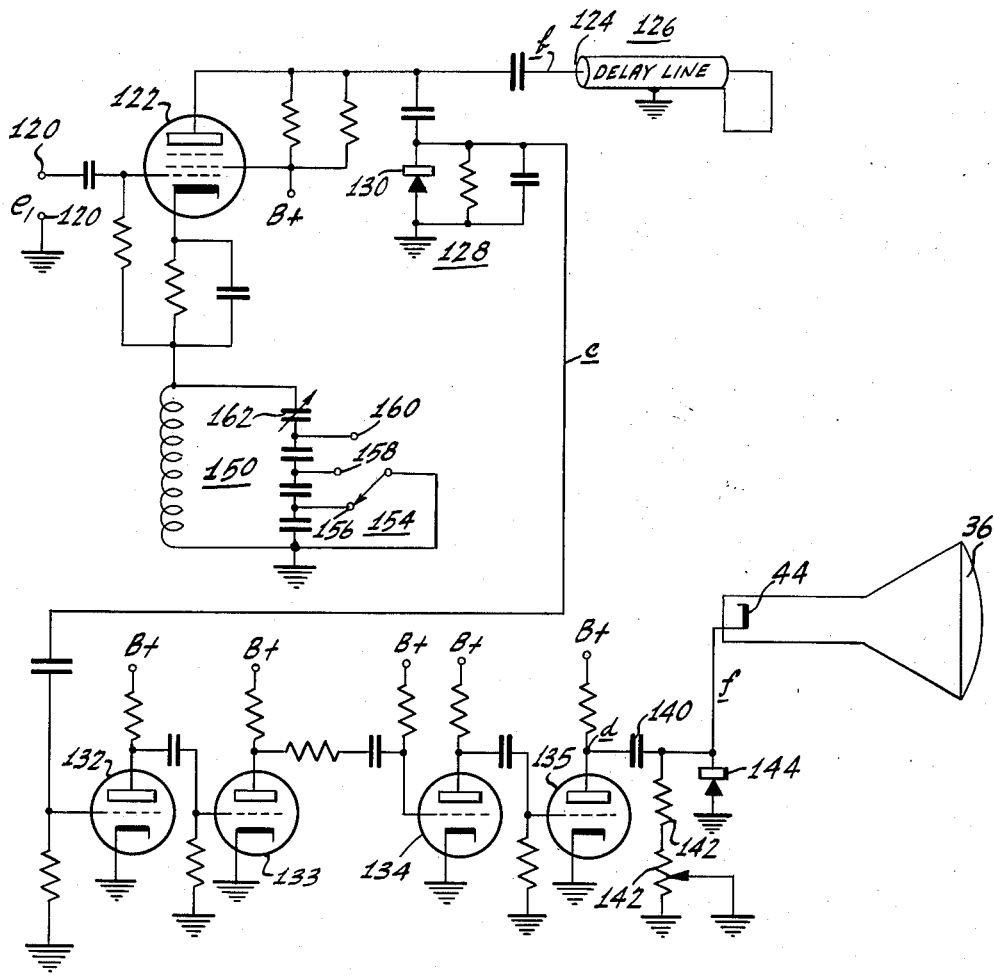
Figure 1 is a schematic circuit diagram of a marker circuit according to the invention.

Referring to Figure 1, an input wave $e_1$ which is cyclically swept in frequency, is applied to the input terminals 120 of the circuit and thence to the control grid of input amplifier 122. The amplified wave is applied to the sending end 124 of delay line 126. The delay line is terminated at its receiving end in a short circuit so that the waves transmitted down the line are reflected back toward the sending end thereof. The delay line preferably provides uniform delay to the entire input frequency band, that is to the entire frequency band from zero to 10 mc. It may be of the "compensated" type such as described in Kallmann Patent No. 2,461,061, issued February 8, 1949, or Finch et al. Patent No. 2,416,683, issued March 4, 1947, or any other type of constant delay line. The resultant wave at sending end 124 of the delay line will consist of reinforced portions and cancelled, that is, nodal or null portions, the latter occurring at the frequencies the reflected wave is 180° out of phase with the applied wave. The resultant wave $b$ at the sending end of the delay line and other waves to be discussed below are illustrated in Figure 2.

Figure 2:
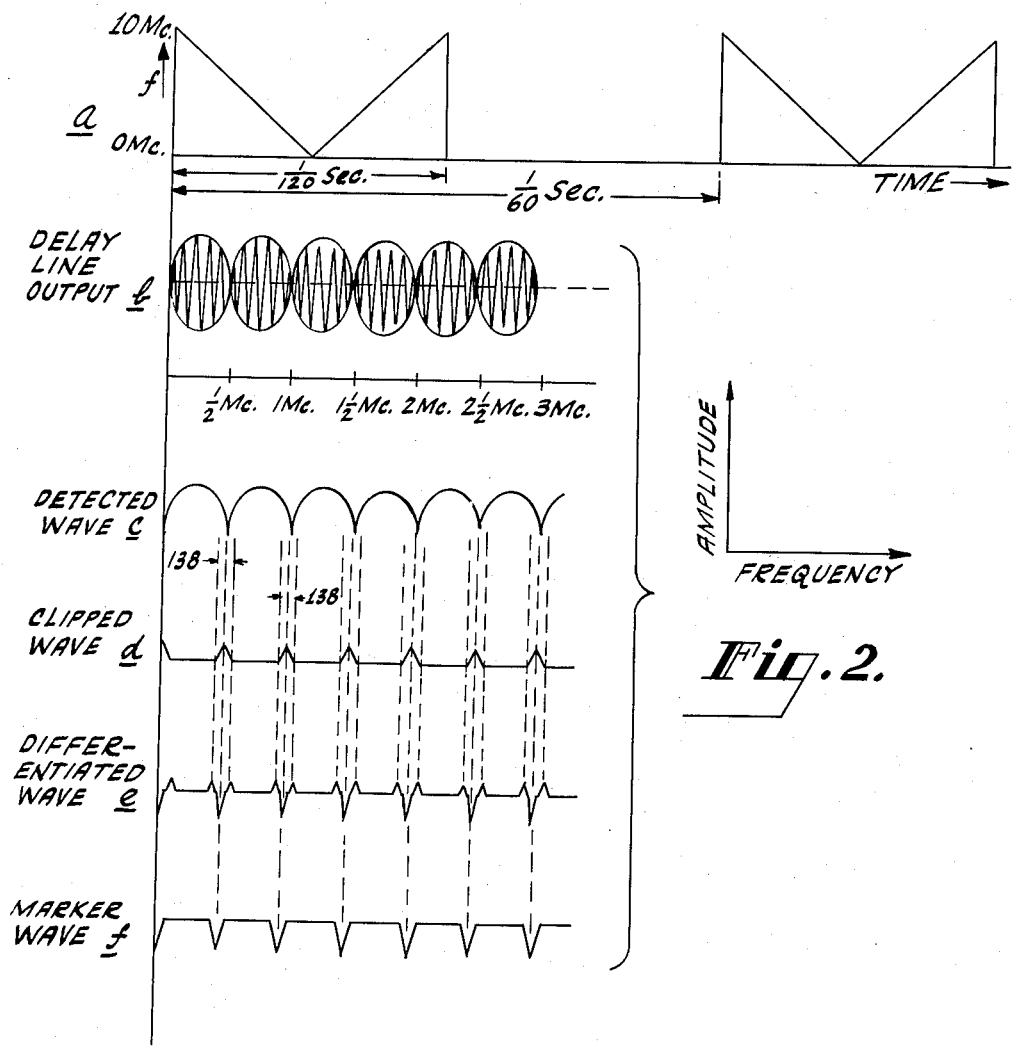
Figure 2 is a drawing of the waveforms at various portions of the circuit shown in Figure 1.

Referring briefly to Figure 2, the first waveform $a$ is plotted on a time vs. frequency scale. It is the swept frequency wave $e_1$ applied to terminals 120 of Figure 1. The remaining waveforms $b$–$f$ inclusive are plotted on an amplitude vs. frequency scale.

Returning to Figure 1, wave $b$ is detected by detector circuit 128 including diode 130. Although in an embodiment of the invention built a diode 130 was employed, it will be appreciated that this stage may be omitted if the first of amplifiers 132–135 inclusive is a non-linear device so that it detects. Detected wave $c$ is shown in Figure 2.

Amplifiers 132–135 inclusive are operated so that they amplify only the null portions 138 (see Figure 2c) of the input wave. The resultant wave $d$ at the anode of the last stage 135 is shown in Figure 2d. Circuit 140, 142 is an R-C differentiator circuit and produces from wave $d$ the differentiated wave $e$ which consists of positive-going and negative-going pulses. The positive-going portions of the differentiated wave are eliminated by diode 144. The resultant marker pulses $f$ may be applied to the cathode 44 of a cathode ray tube indicator 36 to intensify the indicator beam. It will be appreciated that the negative-going pulses may be applied to an inverter stage such as a triode (not shown) in order to invert the pulses and these positive-going pulses then applied to the control grid (not shown) of the CRT to intensity modulate the beam.

The spacing of marker pulses $f$ is a direct function of the effective length of delay line 126. In an embodiment of the invention constructed, the length of the line was chosen to provide markers spaced 500 kc. from one another. However, in other types of circuits these may be closer or further from one another as required.

Although the circuit illustrated in Figure 1 employs a short-circuited delay line, if desired, an open-circuited line such as shown in Figure 3 or one terminated at both ends in its characteristic impedance $R_c$ as shown in Figure 4 may be employed instead. The advantage of the short-circuited line is that the marker immediately adjacent the zero reference point is spaced in frequency therefrom the same amount as the remaining markers are spaced from one another. On the other hand, if an open-circuited line is employed, the first nodal point is spaced from the zero reference point an amount which is half the spacing between the remaining pulses. This last is also true of the delay line illustrated in Figure 4.

The above phenomena may be explained in terms of wavelengths. In the case of a short-circuited line, as the frequency of the wave increases, the line appears to have different lengths to the different frequency components of the waves. At some given wave frequency (which one is determined by the line length), the line will appear to be a half wavelength long. At that frequency the reflected wave will be exactly 180° out of phase with the input wave whereby a nodal point is produced. Similarly at a given, harmonically related higher wave frequency the line will appear to be one wavelength long, whereby another nodal point is produced. Thus, the first frequency marker is spaced from the zero reference point the same amount as the second marker is spaced from the first marker.

In the case of the open-circuited line, however, the first nodal point occurs at the frequency at which the line appears to be one-quarter wavelength long and not at the frequency the line appears to be one-half wavelength long. Therefore, the first marker occurs at the former frequency. The next nodal point does not occur until the input frequency at which the line appears to be three-quarters of a wavelength long. Thus, the spacing between the zero reference point and the first marker is one-half that of the spacing between the first marker and the second marker. The same situation prevails for the line shown in Figure 4.

The cathode circuit of the input amplifier 122 of Figure 1 includes a tuned circuit 150 which is adjustable in frequency. Thus, moving arm 152 of switch 154 to the different taps 156, 158, 160 inserts different amounts of capacitance in the tuned circuit. Fine adjustment of the capacitance in the tuned circuit is provided by variable capacitor 162. At the frequencies to which tuned circuit 160 is tuned, the cathode circuit presents a high impedance to the input wave and the result is a "hole" or nodal point in wave $b$. This hole may be used as an interpolation marker. Since the latter may readily be compared with the delay line markers (Figure 2f), accurate calibration of tuned circuit 150 is not needed.

In one form of the invention, the external indicator (not shown) for circuit 150 includes a dial with marks thereon to indicate the position of switch 154. A second calibrated dial is mechanically coupled to condenser 162. This last dial is calibrated by comparing the position of the interpolation marker with that of the fixed markers.

In the above embodiment of the marker circuit, the 500 kc. spaced marker dots (Figure 2f) were found to be accurate to about ±25 kc. at 6 mc. with error decreasing essentially linearly with frequency.

In the circuits illustrated in Figures 1, 3 and 4, the delay line employed is a length of coaxial cable. It will be appreciated that other types of delay lines such as distributed parameter delay lines may be employed instead. It is important, however, that the delay line provide uniform delay over the entire input frequency band if it is desired to have frequency markers equally spaced from one another. On the other hand, there may be some applications in which it is desired to have the markers spaced further from or closer to one another in certain frequency regions. In such cases, delay lines may be employed which are non-linear in said frequency regions. For example, if an "uncompensated" delay line is employed, its effective inductance decreases in the frequency region in which the electrical length of the line approaches the wavelength of the applied wave. In this region, therefore, the delay introduced by the line (which is equal to $\sqrt{LC}$) decreases and the frequency markers generated would be spaced further from one another.

The marker generator described above may be made more adaptable to different testing situations by making the delay line variable in length. This may be done in a number of ways. Figures 5 and 6 are two examples. The circuits shown include inductive elements 150 and capacitive elements 152. In the arrangement of Figure 5, mechanical switches 154A–154C, inclusive, are used to alter the effective length of an open-circuited line. In the arrangement of Figure 6 switch 157 alters the effective length of short-circuited line. It will be understood, of course, that the drawings of the delay line in Figures 11 and 12 are merely for purposes of illustration since, as will be understood by those skilled in the art, the delay line normally consists of a number of sections much greater than three or four, and moreover, in many types of delay lines the capacitive elements are distributed rather than lumped as shown.

The length of the delay line may also be made variable by employing electronically controllable delay components. Thus, for example, the capacitors may be formed of a dielectric of the type, the dielectric constant of which is variable in response to different values of direct potential applied to the capacitor plates. In another form of the invention, the delay line may be formed with inductive elements which are electronically variable in value. Delay lines of these types are shown in Heath Patent 2,650,350, issued August 25, 1953.

A typical variable sweep oscillator system which may be employed to supply the wave $e_1$ is shown in Figure 7. Fixed frequency oscillator 14 has its tuned grid circuit 54 tuned to 25 mc. and its tuned plate circuit 56 tuned to the second harmonic 50 mc. The blanking voltage from terminal 58 is applied to control grid 60 of the fixed frequency oscillator and serves to cut off the oscillator on alternate half cycles. The blanking voltage is preferably a square wave or other wave with steep sides. The oscillator is periodically blanked to obtain a zero reference which generated the central reference marker in the CRT display shown in Figure 3 of the parent of this application. It will be understood that if the central marker is not required, the blanking generator may be omitted. Since the oscillator is in other respects conventional it is believed to be unnecessary to give further details of its mode of operation.

Oscillator 16 is swept in frequency over the 40 to 60 mc. band. The sweep drive means of the oscillator is electromechanical and includes a source of alternating current 64, a source of direct current 66, and solenoid 65. Both current sources are adjustable in a preferred form of the invention.

The alternating current cyclically drives solenoid armature 63 between the fixed plates of capacitor 62 to vary the effective capacitance introduced by the latter. Since capacitance 62 is the lumped capacitive element of the tuned plate circuit of oscillator 16, variations in its value cause variations in the output frequency of said oscillator.

The magnitude of the direct current determines the center frequency of the swept frequency band. This permits one to short out the alternating current source, whereby the wave applied to the respective constant delay networks and the network under test (shown and described in the parent application) consists of a single frequency rather than a swept band of frequencies.

The amplitude of the alternating current wave supplied by source 64, which may be a 60-cycle source, determines the extent of frequency deviation of the variable sweep oscillator 16. As shown in Figure 7, in one form of the invention oscillator 16 is continuously varied in frequency from 40–60 mc. and then back from 60–40 mc., etc. The resultant swept wave $e_1$ varies from 10 mc. to 0 (50 mc. minus 40 mc. to 50 mc. minus 50 mc.) and then back from 0 to 10 mc. (50 mc. minus 50 mc. to 60 mc. minus 50 mc.). Alternate cycles (one cycle=10 mc. to 0 to 10 mc.) of this wave are blanked by generator 46 (Figures 2 and 4 of the parent application) and the resultant wave is as shown in Figure 2a.

It is to be understood that the invention is not limited to the specific type of drive means shown for sweeping the variable frequency oscillator over a given frequency band. Thus, it will be apparent to those skilled in the art that the frequency output of the oscillator could be varied solely by mechanical means such as a motor. In a typical arrangement of this type, the motor drives the movable plates of a variable capacitor so as to continually vary its capacitance in a manner dependent of the plate shapes and motor frequency. In a similar manner, the oscillator may be made variable by continuously electrically or mechanically varying the inductance of the tuned frequency determining circuit of the oscillator.

The output of the fixed frequency oscillator 14 is shifted 45° in one direction by the resistor capacitor combination 68, 70 and is shifted 45° in the opposite direction by the resistor capacitor combination 72, 74. Capacitors 70 and 74 are variable and are adjusted to produce precise frequency shifts of +45° and —45° respectively at the 50 mc. output frequency of oscillator 14. Modulators 16 and 18 are linear modulators with low impedance outputs. In an embodiment of the invention constructed, the modulators comprised type 6AS6 tubes. The suppressor grids of the modulators are clamped by diode 76 to prevent them from being driven positive. The outputs of the modulators include the sum and difference frequencies and carrier frequencies of the fixed and variable frequency oscillators. The sum and carrier frequency components of the output wave are suppressed by radio frequency chokes 78 and 80 of the respective output circuits of modulators 15 and 18. Outputs $e_1$ and $e_1'$, which differ in phase by 90°, are available at output terminals 82 and 84 of the sweep frequency system.

As mentioned above, the modulator tubes have low impedance outputs. If larger sweep outputs are required, the modulators may be provided with higher load impedances and may then be followed by coupling cathode follower stages.

An important advantage of the circuit of the present invention is that no tuned circuits (except for the marker circuit 150) are employed in the marker generator. Thus, the bandpass of the circuit is broad and this permits any type of input wave, sinusoidal, square, triangular, or otherwise, to be used as the input swept wave of the circuit. The circuit is also insensitive to harmonic distortion for the same reason.

Another important advantage of the marker circuit in the present invention is the complete absence of "twinkling" effect. The twinkling effect is the variation in amplitude of the marker pulses and is commonly present in marker generator circuits employing beat oscillators. This is because the phase of the waves from the swept and the beat oscillators is arbitrary and when at the same frequency, their voltages may either reinforce or cancel, depending on whether they are in or out of phase.

What is claimed is:

1. A marker generator comprising, in combination, a delay line having a sending end and a mismatched receiving end; means applying to said sending end a wave which varies in frequency through a band such that there is produced at said sending end of said delay line a resultant wave which is a function of said applied wave and the wave reflected from the mismatched receiving end of said delay line and which has null points spaced in frequency from one another; and circuit means connected to receive said resultant wave and responsive to the null points therein for producing marker pulses in time coincidence with said null points.

2. A marker generator as set forth in claim 1, wherein said delay line is terminated at its receiving end in a short circuit.

3. A marker generator as set forth in claim 1, wherein said delay line is terminated at its receiving end in an open circuit.

4. A marker generator as set forth in claim 1, wherein said means for producing marker pulses includes clipping amplifier means for amplifying the null portions of said resultant wave; differentiating means for differentiating said amplified wave; and clipping means for eliminating from said differentiated wave the portions thereof of opposite polarity to the portions thereof in time coincidence with said null points.

5. A marker generator comprising, in combination, a delay line having a sending end and a mismatched receiving end; means applying to said sending end a sinusoidal wave which is cyclically variable in frequency between frequency limits such that there is produced at said sending end of said delay line a wave which is a function of said applied wave and the wave reflected from the mismatched receiving end of said delay line and which has null points spaced in frequency from one another, amplifier means connected to receive said resultant wave for amplifying the regions of the latter immediately adjacent to and including said null points; differentiator means connected to receive said amplified wave for differentiating the latter to produce a series of pulses, some of one polarity and some of the other polarity, the pulses of said one polarity being in time coincidence with said null points; and means coupled to said last-named means for eliminating from said differentiated wave the portions thereof of said opposite polarity.

6. A marker generator as set forth in claim 5, and further including means for adjusting the effective length of said delay line.

7. A marker generator comprising, a delay line, means for producing a wave that is swept in frequency at least through frequency values at which the delay line appears to be $n/4$ through $n/2$ wavelengths long, where $n$ is an integer; a combining circuit to which said wave is applied as a comparatively undelayed wave; means for passing said wave through said delay line to obtain a delayed wave that is delayed a certain amount with respect to said comparatively undelayed wave, means for also applying said delayed wave to said combining circuit whereby there is obtained a resultant wave having null points spaced in frequency from one another, and circuit means connected to receive said resultant wave and responsive to the null points therein for producing marker pulses in time coincidence with said null points.

8. A marker generator as set forth in claim 7, wherein said delay line is mismatched at the end remote from the end to which the comparatively undelayed wave is applied.

9. A marker generator as set forth in claim 7, wherein said delay line is short-circuited at the end remote from the end to which the comparatively undelayed wave is applied.

10. A marker generator as set forth in claim 7, wherein said delay line is open-circuited at the end remote from the end to which the comparatively undelayed wave is applied.

11. A marker generator as set forth in claim 7, wherein said delay line is terminated at opposite ends thereof in its characteristic impedance, and wherein said combining circuit comprises an impedance network coupled between said opposite ends, said impedance network having an impedance which is large compared with that of said characteristic impedance, the output of said network being taken from a point on said impedance network between the ends thereof.

12. A marker generator comprising, means for producing a wave that is swept in frequency through a certain frequency band, a combining circuit to which said wave is applied as a comparatively undelayed wave, a delay line, means for passing said wave through said delay line to obtain a delayed wave that is delayed a certain amount with respect to said comparatively undelayed wave, means for also applying said delayed wave to said combining circuit, said certain frequency band being sufficiently broad to cause the comparatively undelayed wave and the delayed wave to be of opposite phase, when combined, at successively occurring frequencies of said frequency swept wave, and in phase, when combined, for other successively occurring frequencies of said frequency swept wave whereby there is obtained a resultant wave having null points spaced in frequency from one another, and circuit means connected to receive said resultant wave and responsive to the null points therein for producing marker pulses in time coincidence with said null points.

13. A marker generator comprising, means for producing a wave that is swept in frequency through a certain band, a combining circuit to which said wave is applied as a comparatively undelayed wave, a delay line, means for passing said wave through said delay line to obtain a delayed wave that is delayed a certain amount with respect to said comparatively undelayed wave, means for also applying said delayed wave to said combining circuit, said certain frequency band being sufficiently broad to cause the comparatively undelayed wave and the delayed wave to be of opposite phase, when combined, at successively occurring equally spaced frequencies of said frequency swept wave, and in phase, when combined, for other successively occurring equally spaced frequencies of said frequency swept wave whereby there is obtained a resultant wave having null points equally spaced in frequency from one another, and circuit means connected to receive said resultant wave and responsive to the null points therein for producing marker pulses in time coincidence with said null points.

14. In the combination as set forth in claim 13, said delay line being adjustable in length.

References Cited in the file of this patent

UNITED STATES PATENTS

| | | |
|---|---|---|
| 2,195,855 | Fitch | Apr. 2, 1940 |
| 2,438,904 | De Rosa | Apr. 6, 1948 |
| 2,444,438 | Grieg | July 6, 1948 |
| 2,448,718 | Koulicovitch | Sept. 7, 1948 |
| 2,534,535 | Smith et al. | Dec. 19, 1950 |
| 2,554,886 | Stedman et al. | May 29, 1951 |
| 2,568,099 | Townsley | Sept. 18, 1951 |
| 2,598,491 | Bergfors | May 27, 1952 |
| 2,614,245 | Chireix | Oct. 14, 1952 |
| 2,623,106 | Fassberg | Dec. 23, 1952 |
| 2,629,775 | Goldstine | Feb. 24, 1953 |
| 2,784,310 | Cowan | Mar. 5, 1957 |
| 2,808,562 | French et al. | Oct. 1, 1957 |
| 2,856,522 | Bachmann | Oct. 14, 1958 |